United States Patent [19]

Hayashi et al.

[11] Patent Number: 4,660,689
[45] Date of Patent: Apr. 28, 1987

[54] HYDRAULIC BUFFER

[75] Inventors: Makoto Hayashi; Yuji Yokoya, both of Toyota, Japan

[73] Assignee: Toyota Jidosha Kabushiki Kaisha, Japan

[21] Appl. No.: 842,447

[22] Filed: Mar. 21, 1986

[30] Foreign Application Priority Data

Mar. 22, 1985 [JP] Japan .............................. 60-39818[U]

[51] Int. Cl.⁴ .............................................. F16F 9/34
[52] U.S. Cl. ................................. 188/319; 188/322.13
[58] Field of Search ............... 188/316, 317, 319, 285, 188/299, 322.13, 322.22

[56] References Cited

U.S. PATENT DOCUMENTS

| 3,319,741 | 5/1967 | Hauck | 188/317 X |
| 3,365,033 | 1/1968 | Willich | 188/319 |
| 4,463,839 | 8/1984 | Ashiba | 188/299 |

Primary Examiner—Duane A. Reger
Attorney, Agent, or Firm—Finnegan, Henderson, Farabow, Garrett & Dunner

[57] ABSTRACT

A hydraulic buffer comprises a cylinder, a piston disposed slidably in the cylinder to partition the interior of the cylinder into first and second liquid chambers, a piston rod connected with the piston and having a first path communicating to the first liquid chamber and a second path communicating to the second liquid chamber and a control rod disposed in the piston rod. A regulating valve operated by the control rod is disposed in the first path and has a third path capable of affording communication between the first and the second paths. The buffer further comprises a case fixed on an outer peripheral surface of the piston rod in the second liquid chamber and having a fourth path affording communication between the second path and the second liquid chamber and a check valve provided in association to the fourth path.

16 Claims, 10 Drawing Figures

HYDRAULIC BUFFER

BACKGROUND OF THE INVENTION

1. Field of the Invention

This invention relates to a hydraulic buffer and, more particularly, to a hydraulic buffer of variable damping force type suited for a buffer of a suspension for an automobile.

2. Description of the Prior Art

There is disclosed a variable damping force type hydraulic buffer provided with a cylinder, a piston and a piston rod, in which a bypass for affording communication between two liquid chambers defined at both sides of the piston and a regulating valve capable of being operated from the outside are provided in addition to a valve mechanism which is inherently installed in the piston to generate a damping force and the damping force is regulated by opening or closing the bypass with the regulating valve (for example, Japanese Utility Model Public Disclosure (KOKAI) No. 85285/79). In the hydraulic buffer, since it is constituted such that liquid passes through same bypass in the extension and contraction of the piston rod, the ratio of the damping force in the extention to that in the contraction of the piston rod cannot be changed.

A hydraulic buffer disclosed in the Japanese Utility Model Public Disclosure (KOKAI) No. 191448/83 (hereinafter referred to as improved hydraulic buffer) has an inner chamber formed in the piston rod and communicating to one liquid chamber and two oil paths permitting the inner chamber to communicate to the other liquid chamber. A check valve is provided in one oil path, while a shutter capable of regulating individually two oil paths is disposed in the inner chamber to be operated from the outside. By the improved hydraulic buffer can be changed the ratio of the damping force in the extension to that in the contraction of the piston rod to increase the freedom of regulating the damping force.

SUMMARY OF THE INVENTION

In the improved hydraulic buffer, since the shutter of a regulating valve is disposed in the inner chamber of the piston rod and the check valve is disposed inside the regulating valve, the construction of the piston rod is complicated and the diameter of the regulating valve and piston rod will be enlarged.

When the regulating valve is enlarged, a large force is needed to rotate it. As a result, when the regulating valve is rotated by a rotor or other actuator, torque required by the actuator is increased to enlarge the shape of the actuator so that not only weight and cost are increased, but also the mounting property of the actuator on a vehicle is degraded.

Since it becomes difficult to form the valve mechanism for generating the damping force in the piston connected with the piston rod as the outer diameter of the piston rod is enlarged, the outer diameter of the piston has to be enlarged, resulting in enlargement of the whole hydraulic buffer including the piston and the cylinder.

When the outer diameters of the regulating valve and the piston rod are attempted to be as small as possible, the check valve becomes smaller so that not only controllable oil amount is limited, but also working accuracy and sealing property under the checked condition are degraded. Further, the incorporating operability of the regulating valve and others is remarkably degraded.

An object of the present invention is to provide a hydraulic buffer which can change the ratio of the damping force in the extension to that in the contraction of a piston rod.

A further object of the present invention is to provide a hydraulic buffer which can form the outer diameters of a regulating valve and the piston rod small to reduce the required rotational torque.

A still further object of the present invention is to provide a hydraulic buffer which can increase controllable oil amount to expand the regulating extent of the damping force and improve the regulating accuracy.

A yet further object of the present invention is to provide a hydraulic buffer which can improve the incorporating operability thereof.

A hydraulic buffer according to the present invention comprises a cylinder, a piston disposed slidably in the cylinder to partition the interior of the cylinder into first and second liquid chambers, a piston rod connected with the piston and having a first path communicating to the first liquid chamber and extending axially and a second path extending inward from an outer peripheral surface, a control rod disposed in the piston rod and a regulating valve operated by the control rod, disposed in a position in the first path facing the second path and having a third path capable of affording communication between the first and the second paths.

The buffer further comprises a case fixed to a position located in the second liquid chamber on an outer peripheral surface of said piston rod and a check valve. In one embodiment, said case has a fourth path for affording communication between the second path and the second liquid chamber, and said check valve provided in association with the fourth path blocks liquid flow from the second liquid chamber to the first liquid chamber in the extension of the piston rod and allows the liquid to flow from the first liquid chamber to the second liquid chamber in the contraction of the piston rod. In another embodiment, the check valve blocks liquid flow from the second liquid chamber to the first liquid chamber when the piston rod extends, and a fourth path is formed between the case and the check valve when the piston rod contracts so that said check valve allows the liquid to flow from the first liquid chamber to the second liquid chamber. A fifth path is provided in said piston rod or said case for allowing the liquid flow between the first and the second liquid chambers, and the regulating valve is capable of regulating the effective area of the fifth path in the extension and contraction of the piston rod.

For example, the third path of the regulating valve is constituted from a plurality of path portions having different bores, or the second path of the piston rod is constituted from a plurality of path portions having different bores.

When piston speed is low in the extension of the piston rod, liquid subjected to a compressive force in the second liquid chamber flows from the fifth path through the first path to the first liquid chamber to generate the damping force in a so-called orifice region. When the piston speed becomes higher, the liquid in the second liquid chamber flows not only through said path, but also through a valve mechanism provided inherently in the piston to generate the damping force in a so-called valve region.

When the piston speed is low in the contraction of the piston rod, the liquid subjected to the compressive force in the first liquid chamber flows from the first path through the second and the fourth paths to the second liquid chamber after pushing up the check valve and further flows from the first path through the fifth path to the second liquid chamber to generate the damping force in the orifice region. When the piston speed becomes higher, the liquid in the first liquid chamber flows not only through said paths, but also through the valve mechanism provided inherently in the piston to generate the damping force in the valve region.

Since the liquid flows also through the second and the fourth paths in the contraction of the piston rod, the ratio of the damping force in the extension to that in the contraction can be changed.

The hydraulic buffer is provided with the check valve for blocking the liquid flow from the second liquid chamber to the first liquid chamber in the extension of the piston rod while allowing the liquid to flow from the first liquid chamber to the second liquid chamber in the contraction of the piston rod, and thus the liquid amount flowing through positions contributing to the generation of the damping force in the contraction of the piston rod will differ from that flowing in the extension so that the ratio of the damping force in the extension to that in the contraction of the piston rod can be changed.

Since the check valve is disposed outside the piston rod, the outer diameter of the regulating valve and piston rod can be formed as small as possible. As a result, the torque required to rotate the regulating valve can be reduced and a compact actuator can be provided to restrain the increase of weight and cost. Also, the whole hydraulic buffer including the piston rod, piston and cylinder can be made compact so that the increase of weight and cost can be also restrained from this point of view.

Since the check valve is disposed outside the piston rod and thus there is no need to mount the check valve inside the regulating valve, the incorporating operability can be remarkably improved to reduce the cost.

Since the check valve is disposed outside the piston rod, the check valve and a contacting portion of the case to the check valve can be formed largely so that they can be worked easily with high accuracy to reduce the cost also from this point of view. Also, the sealing property under the checked condition can be improved.

By constituting the third path provided in the regulating valve or the second path provided in the piston rod from two or a plurality of path portions can be much increased the freedom of changing over the damping force.

Since the outer diameter of the piston rod can be reduced, when the hydraulic buffer is used for a suspension of an automobile for example, not only the hydraulic buffer as a strut of Macfurson strut type suspension, but also that of standard type can be constituted according to the present invention.

BRIEF DESCRIPTION OF THE DRAWINGS

The other objects and features of the invention will become apparent from the following description of preferred embodiments of the invention with reference to the accompanying drawings, in which.

DESCRIPTION OF THE PREFERRED EMBODIMENTS

Figure 1:
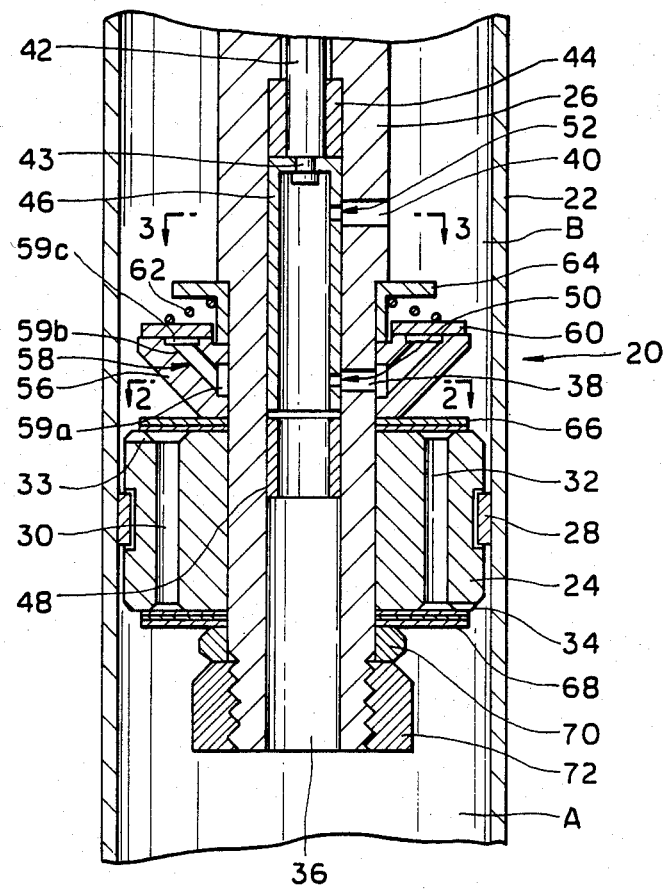
FIG. 1 is a sectional view showing principal parts of a hydraulic buffer according to the present invention.

A hydraulic buffer 20 comprises a cylinder 22, a piston 24 and a piston rod 26.

In the embodiment shown, the hydraulic buffer 20 is of so-called mono-tube type provided with a single cylinder 22. Instead, it can be of so-called twin tube type of the hydraulic buffer provided with two cylinders disposed coaxially.

The piston 24 is disposed slidably in the cylinder 22 and has a piston band 28 on an outer peripheral surface to partition liquid-tightly the interior of the cylinder into a first and a second liquid chambers A and B. The first liquid chamber A is a chamber in which liquid pressure is generated in the contraction of the piston rod 26, and the second liquid chamber B is one in which the liquid pressure is generated in the extension of the piston rod 26.

As will be later described, an end of the piston rod 26 extends through the piston 24 to connect the piston 24 with the piston rod 26. The piston 24 has a plurality of ports 30 (one of then is shown in the drawings) spaced circumferentially for flowing liquid in the extension of the piston rod 26 and a plurality of ports 32 (one of them is shown in the drawings) spaced circumferentially for flowing liquid in the contraction of the piston rod 26, and the liquid chambers A, B communicate to each other through these ports 30,32. Each of one ports 30 and the other ports 32 communicate respectively to a recess 33 formed on an upper end face of the piston 24 and a recess 34 formed on a lower end face of the piston 24. The recess 33 causes the liquid to flow in the extension of the piston rod 26 and the recess 34 causes the liquid to flow in the contraction of the piston rod 26.

The piston rod 26 enters the cylinder 22 through a rod guide and a seal member (both not shown) disposed in the opening end of the cylinder 22. The piston rod 26 has a path 36 communicating to the first liquid chamber A and extending axially and a path 38 extending inward from an outer peripheral surface. In the embodiment shown in FIG. 1, the path 36 is in the form of a hole extending through the piston rod 26 from a lower end face to an upper end face thereof, and the path 38 opens to the path 36. The piston rod 26 has a path 40 extending inward from an outer peripheral surface at a position spaced axially from the path 38 and opening to the path 36. Liquid flows through the path 40 in the extension and contraction of the piston rod 26.

A control rod 42 is disposed in the path 36 of the piston rod 26. The path 36 has the diameter reduced above the path 40, and the control rod 42 inserted into the reduced diameter portion is rotatably supported by a bearing 44 abutting against a shoulder thereof and an upper bearing (not shown). A clearance between the piston rod 26 and the control rod 42 is made liquid-tight with an O-ring (not shown). The end of the control rod 42 projecting from the piston rod is connected to an actuator. Since said constitution of the control rod 42 is well known per se, the detailed description is omitted.

A regulating valve 46 formed cylindrically has a ceiling portion penetrated by a reduced diameter portion 43 of the control rod 42 and fixed to the control rod 42 by caulking the reduced diameter portion 43. Thus, the regulating valve 46 can be rotated together with the control rod 42. The regulating valve 46, in the embodiment shown, having an axial length exceeding that from the path 38 of the piston rod to the path 40 is disposed to face the path 38,40 in the path 36 of the piston rod and supported by the bearing 44 and a cylindrical stopper 48 forced into the path 36.

The regulating valve 46 has a path 50 capable of affording communication between the paths 36,38 and further in the embodiment shown a path 52 capable of affording communication between the paths 36,40.

Figure 2:
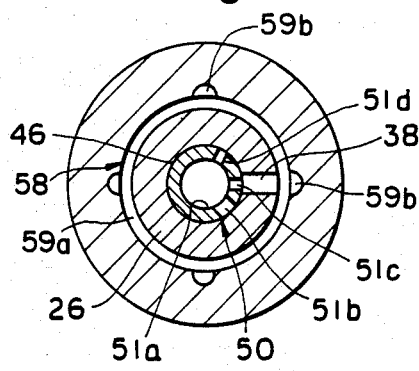
FIG. 2 is a sectional view taken along the line 2—2 in FIG. 1.

As shown in FIG. 2, the path 50 consists of a path portion 51a extending axially, path portions 51b,51c and 51d extending respectively from the path portion 51a to an outer peripheral surface and spaced circumferentially 60° from each other. The path portions 51b,51c and 51d are formed to have bores reduced progressively in the order mentioned. On the other hand, the path 38 of the piston rod 26 is formed to have a bore larger than that of the largest path portion 51b. As a result, the amount of liquid flow is determined by the effective areas of the path portions 51b,51c and 51d, and the damping force in an orifice region is determined by these areas.

Figure 3:
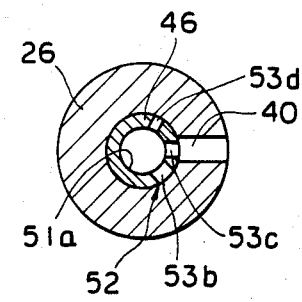
FIG. 3 is a sectional view taken along the line 3—3 in FIG. 1.

As shown in FIG. 3, the path 52 consists of the path portion 51a extending axially, path portions 53b,53c and 53d extending respectively from the path portion 51a to an outer peripheral surface and spaced circumferentially 60° from each other. The path portions 53b,53c and 53d are formed to have the bores reduced progressively in the order mentioned and are in the same phase relation to the path portions 51b,51c and 51d respectively. On the other hand, the path 40 of the piston rod 26 is formed to have a bore larger than that of the largest path portion 53b. As a result, the amount of liquid flow and thus the damping force in an orifice region are determined by the effective areas of the path portions 53b,53c and 53d. As is apparent from the above mentioned, in the embodiment shown, the camping force can be changed over to three stages.

A case 56 is fixed to a position located in the second liquid chamber B on the outer peripheral surface of the piston rod 26. The case 56 is generally tubular and has a path 58 affording communication between the path 38 and the second liquid chamber B. In the embodiment shown, the path 58 consists of a groove-like path portion 59a provided over the whole inner peripheral surface and facing the path 38, at least a path portion 59b extending obliquely upward from the path portion 59a and a groove-like path portion 59c provided over the whole circumference on an upper end. The groove-like path portion 59a facilitates communication to the path 38 and the groove-like path portion 59c exerts uniformly liquid pressure to a check valve which will be later described.

A check valve 60 formed of an annular plate member is disposed axially movably on an upper side of the case 56 and biased toward an upper end face of the case 56 by a coil spring 62. The check valve 60 covers the path portion 59c of the path 58 to block liquid flow from the second liquid chamber B to the first liquid chamber A in the extension of the piston rod 26, but allows liquid to flow from the first liquid chamber A to the second liquid chamber B in the contraction of the piston rod 26. The spring constant of the coil spring 62 is small so that the check valve 60 is kept away from the case 56 when slight liquid pressure is generated in the liquid chamber A.

Into the piston rod 26 are inserted a stopper 64, the coil spring 62, the check valve 60, the case 56, a leaf spring 66, the piston 24, a leaf spring 68 and a washer 70 in the order mentioned, and a nut 72 is screwed onto the piston rod 26 to sandwich said parts between the nut and a shoulder of the piston rod 26 and incorporate said parts in the piston rod 26. Under the incorporated condition, the path portion 59a of the path 58 of the case 56 faces the path 38 of the piston rod 26.

The leaf springs 66,68 generate the damping force in a valve region respectively in the contraction and extension of the piston rod 26.

Figure 4:
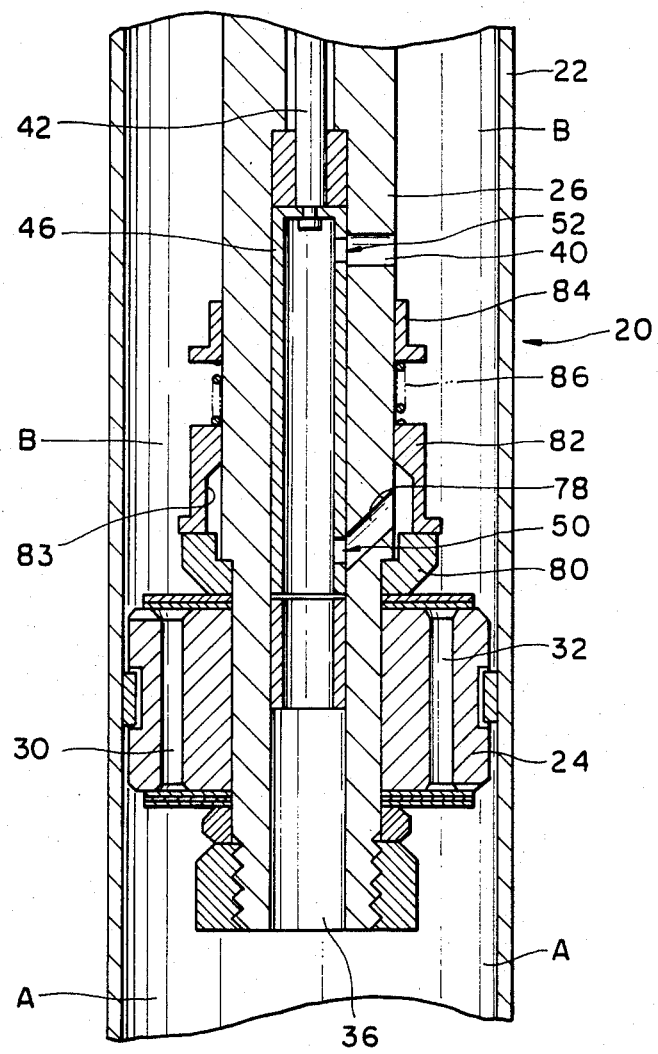
FIGS. 4 and 5 are sectional views showing principal parts of another embodiments of a hydraulic buffer.

In the hydraulic buffer 20 shown in FIG. 4, a path 78 provided in the piston rod 26 is formed obliquely upward to an outer peripheral surface and a case 80 is sandwiched by the shoulder of the piston rod 26 and the piston 24. A check valve 82 formed generally cylindrically is attached movably along the outer peripheral surface of the piston rod 26. A stopper 84 is forced into the piston rod 26 and a coil spring 86 having one end engaged with the stopper 84 bears against the check valve 82 on the other end to bias the check valve 82 toward the case 80. The check valve 82 has a recess 83 in a position facing the path 78 of the piston rod 26 on an inner peripheral surface.

In the embodiment shown, under the condition that the check valve 82 contacts closely to the case 80, the recess 83 does not communicate to the second liquid chamber B since the case 80 has no any paths. When the check valve 82 is moved by liquid pressure and kept away from the case 80, a gap produced between the case 80 and the check valve 82 forms a path affording communication between the path 78 and the second liquid chamber B.

In the embodiment shown in FIG. 4, since the path 78 of the piston rod 26 is inclined upward, a force based upon liquid pressure and a force generated by liquid flow will act on the check valve 82 so that the check valve 82 can be more securely moved.

Figure 5:
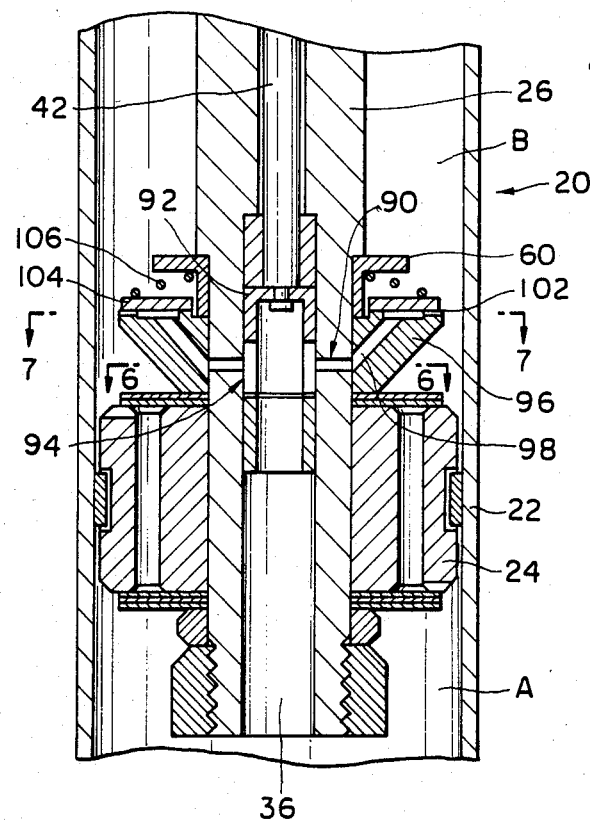

In the hydraulic buffer 20 shown in FIG. 5, a path 90 of the piston rod 26 consists of three path portions 91a,91b and 91c as shown in FIG. 6. The path portions 91a,91b make an angle of 60° to each other and the path portions 91a, 91c make an angle of 180° to each other. On the other hand, a path 94 of a regulating valve 92 consists of a path portion 95a extending axially, path portions 95b and 95c cut away from the path portion 95a diametrically. The center angles of the path portions 95b,95c are set to about 80°.

Figure 6A:
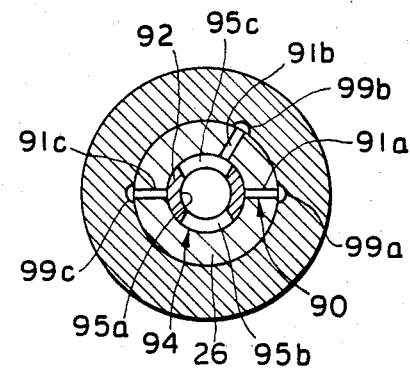
FIG. 6 is a sectional view taken along the line 6—6 in FIG. 5, FIGS. 6(a), (b) and (c) showing respectively the conditions of a regulating valve when rotated.
Figure 6B:
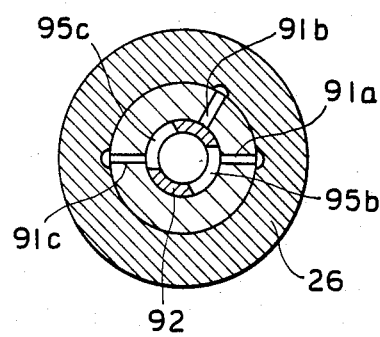
Figure 6C:
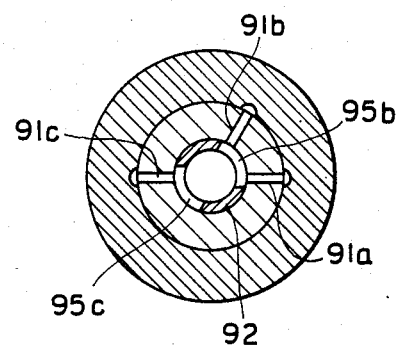

When the regulating valve 92 is in the position shown in FIG. 6a, the path portion 95c of the path 94 communicates to the path portion 91b of the path 90, and when the regulating valve 92 is in the position shown in FIG. 6b, the path portion 95b of the path 94 communicates to the path portion 91a of the path 90 and the path portion 95c communicates to the path portion 91c respectively. And when the regulating valve 92 is in the position shown in FIG. 6c, the path portions 95b,95c of the path 94 communicate respectively to the path portions 91a,91b and 91c of the path 90.

Figure 7:
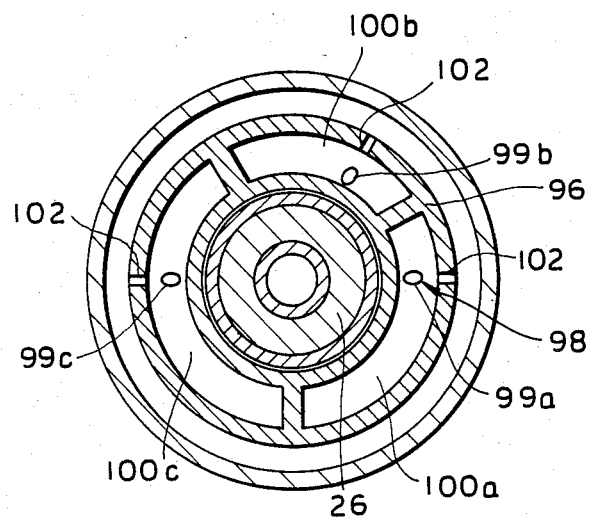
FIG. 7 is a sectional view taken along the line 7—7 in FIG. 5.

As shown in FIGS. 6 and 7, a path 98 of a case 96 consists of path portions 99a,99b and 99c communicating respectively to the path portions 91a,91b and 91c of the path 90 of the piston rod 26 and arcuate path portions 100a,100b and 100c provided on an upper end face, and the path portions 99a,99b and 99c communicate respectively to the path portions 100a,100b and 100c.

The case 96 is provided with a path 102. In the embodiment shown, the path 102 is a notch extending from the respective path portions 100a,100b and 100c of the path 98 to an outer peripheral surface to constitute an orifice together with a check valve 104 biased by a coil spring 106. The effective area of the path 102 is formed smaller than that of any of the path portions associated with this path 102 and the damping force is determined by the effective area of the path 102.

Operation of the Embodiments:

When the piston rod 26 extends;

When the speed of the piston 24 is low, liquid in the liquid chamber B flows from the path 40 to the path 36 and then to the liquid chamber A. Then, the damping force is determined by the path 52 of the regulating valve 46. That is, when either of the path portions 53b,53c and 53d of the path 52 communicates to the path 40, the damping force varies in the form of a curve of secondary degree like $C_1,C_2$ and $C_3$ in the order mentioned in FIG. 8.

Figure 8:
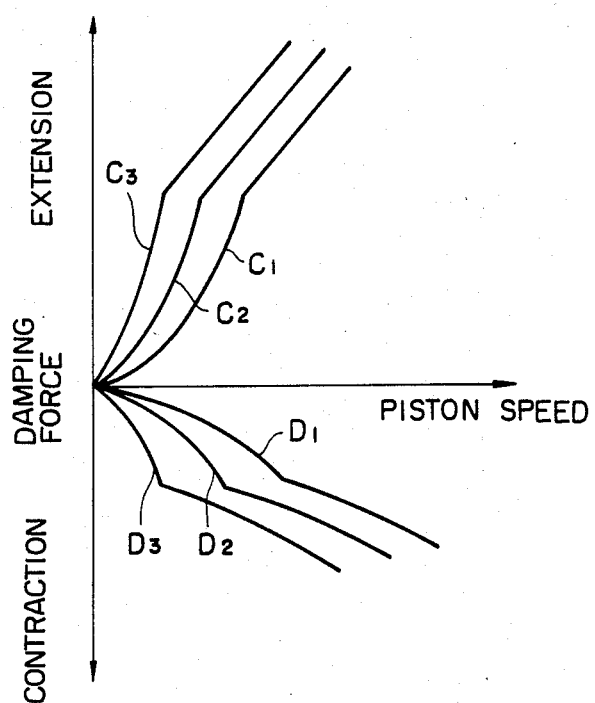
FIG. 8 is a characteristic graph showing relationship between piston speed and damping force.

When the speed of the piston 24 is increased and the leaf spring 68 is depressed by pressure of liquid flowing from the recess 33 into the port 30, the damping force is generated mainly here and varies approximately linearly as shown in FIG. 8.

When the piston rod 26 contracts;

When the speed of the piston 24 is low, liquid in the liquid chamber A flows from the path 36 through the paths 38,56 to the liquid chamber B after pushing up the check valve 60 and further from the path 36 to the path 40 and then to the liquid chamber B. The damping force then is determined by the paths 50,52 of the regulating valve 46. That is, when either of the path portions 51b,51c and 51d of the path 50 communicates to the path 38 and either of the path portions 53b,53c and 53d of the path 52 communicates to the path 40, the damping force varies in the form of a curve of secondary degree in the order of $D_1,D_2$ and $D_3$ in FIG. 8.

When the speed of the piston 24 is increased and the leaf spring 66 is pushed up by pressure of liquid flowing from the recess 34 into the port 32, the damping force is generated mainly here and varies approximately linearly as shown in FIG. 8.

The operation of the hydraulic buffer shown in FIGS. 4 and 5 respectively is same as the above mentioned.

What is claimed is:

1. A hydraulic buffer comprising:
   a cylinder;
   a piston disposed slidably in the cylinder to partition the interior of the cylinder into first and second liquid chambers;
   a piston rod connected with the piston and having a first path communicating to the first liquid chamber and extending axially and a second path extending inward from an outer peripheral surface thereof;
   a control rod disposed in the piston rod;
   a regulating valve operated by the control rod, disposed in a position in the first path facing the second path of the piston rod and having a third path capable of affording communication between the first and the second paths;
   a case fixed to a position in the second liquid chamber on an outer peripheral surface of said piston rod and having a fourth path affording communication between the second path of the piston rod and the second liquid chamber; and
   a check valve provided in association to the fourth path of said case for blocking liquid flow from the second liquid chamber to the first liquic chamber when the piston rod extends and allowing the liquid to flow from the first liquid chamber to the second liquid chamber when the piston rod contracts.

2. A hydraulic buffer as claimed in claim 1, wherein a fifth path is provided in said piston rod or said case for allowing the liquid flow between the first and the second liquid chambers, and said regulating valve is capable of regulating the effective area of said fifth path when the piston rod extends and contracts.

3. A hydraulic buffer as claimed in claim 2, wherein said third path of the regulating valve comprises a plurality of path portions having bores with different diameters, and said fifth path is regulated in the same number of stages as that of the path portions of the third path.

4. A hydraulic buffer as claimed in claim 3, wherein said third path consists of three path portions.

5. A hydraulic buffer as claimed in claim 2, wherein said fifth path is provided in a position of siad piston rod axially spaced from said second path and extends inward from the outer peirpheral surface thereof, and said regulating valve has a sixth path capable of affording communication between the first and the fifth paths.

6. A hydraulic buffer as claimed in claim 5, wherein said third path of the regulating valve comprises a plurality of path portions having bores with different diameters, and said sixth path comprises a plurality of path portions having bores with different diameters and being in the same path relation to the path portions of the third path respectively.

7. A hydraulic buffer as claimed in claim 2, wherein said fifth path is provided in said case, and the amount of the liquid flowing through the fifth path is regulated by said third path of the regulating valve.

8. A hydraulic buffer as claimed in claim 1, wherein said regulating valve is formed cylindrically and rotated by the control rod.

9. A hydraulic buffer as claimed in claim 1, wherein said fourth path of the case has a groove-like path portion provided over the whole circumference of the upper end of the case, and said check valve contacts the upper end of the case.

10. A hydraulic buffer as claimed in claim 9, wherein said check valve is formed of an annular plate member.

11. A hydraulic buffer comprising:
    a cylinder;
    a piston disposed slidably in the cylinder to partition the interior of the cylinder into first and second liquid chambers;
    a piston rod connected with the piston and having a first path communicating to the first liquid chamber and extending axially and a second path extending inward from the outer peripheral surface thereof;
    a control rod disposed in the piston rod;

a regulating valve operated by the control rod, disposed in a position in the first path facing the second path of the piston rod and having a third path capable of affording communication between the first and the second paths;

a case fixed to a position in the second liquid chamber on the outer peripheral surface of said piston rod; and a check valve disposed slidably on the outer peripheral surface of the piston rod and being capable of closely contacting said case, wherein said check valve blocks liquid flow from the second liquid chamber to the first liquid chamber when the piston rod extends, and a fourth path is formed between the case and the check valve to afford communication between the second path of the piston rod and the second liquid chamber when the piston rod contracts so that the check valve allows the liquid to flow from the first liquid chamber to the second liquid chamber.

12. A hydraulic buffer as claimed in claim 11, wherein a fifth path is provided in a position of said piston rod axially spaced from said second path and extends inward from the outer peripheral surface thereof, and said regulating valve has a sixth path capable of affording communication between the first and the fifth paths.

13. A hydraulic buffer as claimed in claim 12, wherein said third path of the regulating valve comprises a plurality of path portions having bores with different diameters, and said sixth path comprises a plurality of path portions having bores with different diameters and being in the same phase relation to the path portions of the third path respectively.

14. A hydraulic buffer as claimed in claim 13, wherein said third path and said sixth path consists of three path portions respectively.

15. A hydraulic buffer as claimed in claim 11, wherein said regulating valve is formed cylindrically and rotated by the control rod.

16. A hydraulic buffer as claimed in claim 11, wherein said check valve is formed of a cylindrical member and a recess is formed between the check valve and the piston rod.

* * * * *